Figure 1:
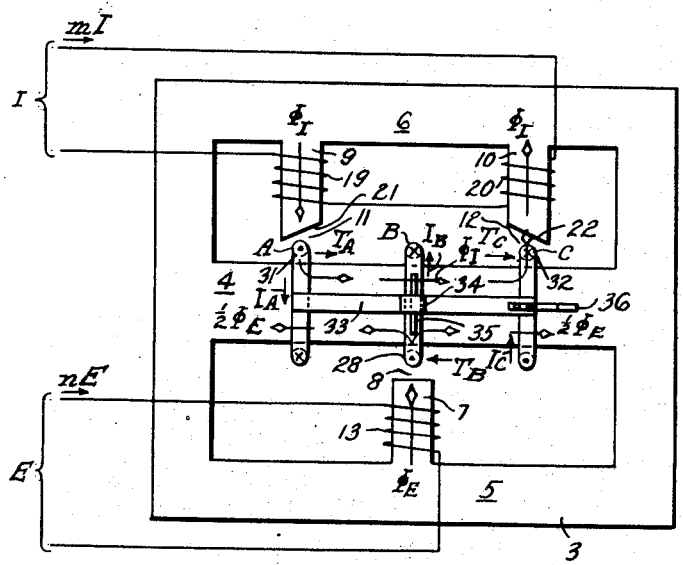

July 10, 1945.   A. C. MEHRING ET AL   2,379,918
THREE-MAGNET DOUBLE-LOOP DIRECTIONAL RELAY
Filed Oct. 2, 1943

WITNESSES:

INVENTORS.
Arthur C. Mehring and
Shirley L. Goldsborough.
BY
O. B. Buchanan
ATTORNEY Patented July 10, 1945

2,379,918

UNITED STATES PATENT OFFICE 2,379,918

THREE-MAGNET DOUBLE-LOOP DIRECTIONAL RELAY

Arthur C. Mehring, East Orange, and Shirley L. Goldsborough, Basking Ridge, N. J., assignors to Westinghouse Electric Corporation, East Pittsburgh, Pa., a corporation of Pennsylvania Application October 2, 1943, Serial No. 504,696

4 Claims. (Cl. 175—294)

Our present invention relates to multiple-loop single-phase directional elements, in which the double-frequency component of the directional torque is eliminated by producing two torques which are related in accordance with three necessary conditions, first, that the phase-angle between the double-frequency pulsations of the two torques is exactly 90 electrical degrees of the line-frequency system (180° of the double-frequency system), second, that the double-frequency components of the two displaced torques must have equal peak-magnitudes, and, third, that these two displaced torques must have a sinusoidal wave-form.

Heretofore, various means have been provided, in an effort to satisfy these conditions for producing non-vibratory, directionally responsive torque, as shown in Patent No. 2,300,886 of the applicant Goldsborough, and Bert V. Hoard, issued November 3, 1942, and also in a copending application, Serial No. 503,366, of the same applicants as the present application, filed September 22, 1943. Heretofore, it has been necessary to provide two different magnetic circuits, one for each of two loops, in order to provide the two displaced torques. This has not only been wasteful of material, affecting the cost and size, and the inertia, and hence the speed of response, of the apparatus, but it has also involved difficulties in precisely matching the two magnetizable circuits for the two pairs of fluxes.

It is an important feature of our present invention that we utilize only one magnetic structure, traversed by two fluxes, in combination with a plurality of movable loops, disposed so that one of the loops is interlinked or excited by one of the fluxes, so that the current in that loop will react with the other flux to produce torque, while another loop or loops is or are traversed by the second flux, so that the current induced therein will react with the first flux to produce torque. Since only two fluxes are utilized, in this manner, there is no possibility of a lack of the precise 90° relationship between the torques, nor any possibility of variation in the magnitudes of the double-frequency components of the two torques, because both torques are the products of the same two fluxes, times the same function of the same phase-angular displacement between said fluxes. The requirement respecting sinusoidal wave-forms is sufficiently satisfied by utilizing a sufficiently generous magnetic circuit, and sufficiently wide airgaps, so as to avoid magnetic saturation.

Figure 2:
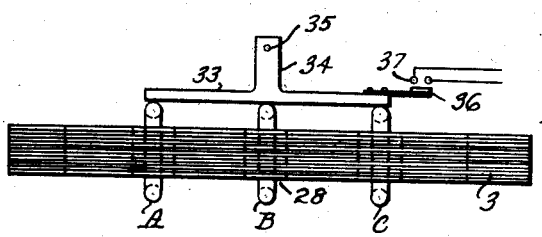

With the foregoing and other objects in view, our invention consists in the circuits, apparatus, systems, parts, constructions, and methods hereinafter described and claimed, and illustrated in the accompanying drawing, wherein:

Figure 1 is a diagrammatic plan-view of circuits and apparatus showing our invention in an illustrative form of embodiment; and Fig. 2 is a simplified or diagrammatic elevational view showing the structure without the coils on the various poles of the field-frame.

In the particular form of embodiment of our invention which is shown in the drawing, we provide a magnetizable frame 3, which may be built of a plurality of magnetizable punchings having a central leg 4, the ends of which are joined to two outer legs 5 and 6, respectively. The first outer leg 5 is provided with a single, centrally disposed pole-piece 7, which extends inwardly toward the central leg 4, from which it is spaced by an airgap 8. The second outer leg 6 is provided with two spaced pole-pieces 9 and 10, which project or extend inwardly toward the central leg 4, from which they are spaced by airgaps 11 and 12, respectively.

The single pole-piece 7 is excited by a coil 13 which produces a first flux, which we will designate $\phi_E$. This flux traverses the airgap 8 and then divides at the center of the middle-leg 4, half of the flux returning through each of the two halves of the central leg 4, and thence back again through the outer leg 5 to the pole-piece 7.

The two pole-pieces 9 and 10 are excited by two coils 19 and 20, respectively, which produce the second flux, which we will call $\phi_I$, which goes in one of the pole-pieces 9 and 10 and out of the other, traversing both of the airgaps 11 and 12, and the portion of the central leg 4, which is between said airgaps. The pole-pieces 9 and 10 are thus north and south poles, at any instant.

In order to avoid a troublesome parasitic "centering" torque, we preferably bevel the pole-faces, or ends of the pole-pieces 9 and 10, as indicated at 21 and 22, respectively, with the bevels facing toward the center, so that the airgaps 11 and 12 are wedge-shaped, with the thick ends of the wedges toward the center. Without this bevelling, the airgap-fluxes tend to hold the loops in the centers of the respective pole-pieces, regardless of the induced currents which are flowing in the loops at the moment. This is particularly objectionable in the loops A and C, for example, when the line-voltage E is very small, as in the case of some faults, while the line-current I is excessively large. Under these circumstances, the operating torque which is responsive to the product of E and I is small, but the "centering" torque is quite large. The "centering" torque results from a linkage of some of the airgap fluxes through the loop in question, which induces a current tending to return the loop to the position of least interlinkage by the airgap flux.

By bevelling the pole-faces, as shown at 21 and 22, a decentering torque is produced, in the two loops A and C, tending to move the loops, in the one direction or the other, away from the centers of the pole-pieces 9 and 10, and by providing the correct amount of bevel, the decentering torque may be caused to exactly balance the centering torque, so as to eliminate the same, or so as to hold it at any desired specific magnitude.

The bevelling of the pole-faces at 21 and 22 has the further advantage of counteracting the tendency of the flux $\phi_I$ to leak off of the face of the pole-pieces 9 and 10, towards the center, as it returns along the central portion of the central leg 4.

A suitable exciting-means may be utilized for energizing the respective coils 13, 19, and 20. As shown in Fig. 1, the coil 13 is energized from a source of alternating-current energy, designated E, which may be a voltage-source, which furnishes a relaying-current $nE$ to said coil 13. The other two coils, 19 and 20, are illustrated as being connected in series and energized from a source of alternating-current energy, designated I, which may be a current-source, and which supplies a relay-current $mI$ to said coils 19 and 20. The coefficients $m$ and $n$ may be any numbers, real, imaginary, or mixed.

Our relay is provided with three loops, designated A, B, and C, all of which are threaded by the central leg 4 of the field-frame 3, with the loops out of contact with the central leg 4. The central loop B has one of its coil-sides 28 lying within the airgap 8. The end-loop A has a coil-side 31 lying in the airgap 11, while the end-loop C has a coil-side 32 lying in the airgap 12.

The three loops A, B, and C are mechanically connected together, as at the top, by a bar 33, having an upwardly extending central lug 34 which is suspended from a horizontally disposed pivot-pin 35.

The top joining-bar 33 may be provided, at one end, with a movable contact-element 36, which cooperates in any desired manner with two stationary relay-contacts 37, as shown in Fig. 2, for controlling any relaying circuit which is to be controlled by our relay.

An important feature of our present invention is that the flux in each magnetic circuit performs a double function. It furnishes the airgap-flux which reacts with the current in one of the loops, which produces one of the torques, and it induces the loop-current in the other loop or loops. Thus any irregularity, which causes either of the torques to vary, will also inherently adjust the other torque in like degree, so that the two pulsating components of the torques shall always be equal to each other, as well as opposite to each other.

Thus, one of the magnetic circuits involves the flux $\phi_E$, which has already been traced, while the second magnetic circuit involves the flux $\phi_I$. The flux $\phi_E$ constitutes the airgap-flux in the airgap 8, which is reacted upon by the loop-current $I_B$ in the loop B, to produce a torque $T_B$ to the left, which we may call a negative torque. Half of the flux $\phi_E$ threads through each of the loops A and C, producing therein identical loop-currents $I_A$ and $I_C$, each of which is proportional to one-half of $\phi_E$.

The other flux $\phi_I$ also performs a double function. It constitutes the airgap-flux in the two airgaps 11 and 12, and it threads through the loop B to induce therein the loop-current $I_B$ which is proportional to said flux $\phi_I$. The two loop-currents $I_A$ and $I_C$ are in opposite directions, but the two airgap-fluxes, in the airgaps 11 and 12, are also in opposite directions, one being under a north pole 9, and the other under a south pole 10. Consequently the torques $T_A$ and $T_C$ of the two loops A and C are both in the same direction, and the diagram shows that these two torques are to the right, in a direction which we call positive.

The total torque, in the positive direction, or to the right, exerted by all three coils A, B and C, at any instant of time, is the vectorial or algebraic sum of the three instantaneous torques $t_A + t_C + t_B$, and each of the instantaneous torques is equal, with suitable constants, or suitable measuring-units, to the product of its loop-current times its airgap-flux. We may assume that the flux $\phi_I$ lags behind the flux $\phi_E$ by any angle $x$, and that the three loops A, B and C are identical, so that their currents are proportional to the current-inducing flux, and lag behind this flux by an angle $y$. With suitable constants, therefore, we may write the three instantaneous torques as $$t_A = t_C = [\phi_I \cos(wt-x)] \cdot [\tfrac{1}{2} \phi_E \cos(wt-y)] = \tfrac{1}{4} \phi_E \phi_I [\cos(x-y) + \cos(2wt-x-y)]$$

$$t_B = [\phi_E \cos wt] \cdot [\phi_I \cos(wt-x-y)] = \tfrac{1}{2} \phi_E \phi_I - \cos(x+y) - \cos(2wt-x-y)$$

The total instantaneous torque will be $$t_A + t_C + t_B = \tfrac{1}{2} \phi_E \phi_I [\cos(x-y) - \cos(x+y)]$$

It will be noted that the double-frequency pulsations, indicated by the functions of $2wt$, cancel out, showing that these pulsations are not only equal in magnitude, but also displaced by 180 degrees with reference to their double frequency, or 90 degrees with reference to the frequency of the alternating fluxes $\phi_E$ and $\phi_I$. The total torque is therefore steady, or non-pulsatory, regardless of the phase-angle $x$ between the two fluxes $\phi_E$ and $\phi_I$, and regardless of the phase-angle $y$ introduced by the loop-characteristics, as long as all three loops are identical. The total torque may be written, $$T_A + T_C + T_B = \phi_E \phi_I \sin x \sin y.$$

The movable element of the relay is suspended from above, so that the two positive torques $T_A$ and $T_C$ tend to rotate the movable element in a counterclockwise direction, so as to close the relay-contacts 36—37.

It will be noted that our explanation of the relay-operation has been perfectly general, based upon the relative phases of the two alternating relay-fluxes $\phi_E$ and $\phi_I$, regardless of how those fluxes were produced in the relay. They do not need to be responsive to a line-voltage and a line-current; they may be directionally responsive to two different line-currents; or they may directionally compare any two single-phase quantities, of a given frequency, whose relative phases or directions are to be responded to. If the fluxed $\phi_I$ and $\phi_E$ are responsive to a line-current and a line-voltage, respectively, one of them may be dephased by an angle $\pm z$, so that the phase-angle $x$ between the fluxes may be equal to the line-power-factor angle θ, plus or minus the angle z.

As previously noted, the bevelling of the pole-faces 21 and 22 of the gaps 11 and 12 tends to keep the flux φ1 moving straight across these gaps, at right-angles to the side-surface of the central core-leg 4, and at approximately right-angles to the direction of movement of the loops A and C. This tends to prevent an objectionable displacement-torque due to leakage-flux.

We claim as our invention:

1. A substantially non-vibratory single-phase torque-producing electro-responsive device comprising a movable member having two loop-systems, and a single magnetizable frame-member for providing two alternating fluxes and applying said fluxes to the two loop-systems in such manner that the first loop-system is interlinked by the first flux and its loop-current has a torque-producing reaction with the second flux, while the second loop-system is interlinked by said second flux and its loop-current has a torque-producing reaction with said first flux, said magnetizable frame-member including magnetizable-material flux-paths, airgap flux-paths, and single-phase exciting-means, for together providing and applying said fluxes.

2. A substantially non-vibratory single-phase torque-producing electro-responsive device comprising a movable member having three mechanically connected loops, and a single magnetizable frame-member for providing two alternating magnetic fluxes and applying said fluxes to the loops in such manner that a half of one flux interlinks each of two of said loops and the whole of said flux has a torque-producing reaction with the current traversing a loop-side of the other loop, and in such manner that the whole of the other flux interlinks said other loop and also has torque-producing reactions with a loop-side of each of the two loops, said magnetizable frame-member including magnetizable-material flux-paths, airgap flux-paths, and single-phase exciting-means, for together providing and applying said fluxes.

3. A substantially non-vibratory single-phase torque-producing electro-responsive device comprising a single magnetizing frame having a central leg and two outer legs joined to the ends of the central leg, one of the outer legs having a single, centrally disposed pole-piece which extends inwardly toward the central leg, being spaced therefrom by an airgap, the other outer leg having two spaced pole-pieces which extend inwardly toward the central leg, being spaced therefrom by airgaps, exciting-coil means for producing two alternating magnetic fluxes, one flux traversing the single centrally disposed pole-piece and its airgap, and returning through the two halves of the central leg, and the other flux serially traversing the two spaced pole-pieces, their airgaps, and the portion of the central leg between said airgaps, and a movable member having three mechanically joined loops, all loosely encircling said central leg, and each having a coil-side in a different one of said airgaps.

4. A substantially non-vibrating single-phase torque-producing electro-responsive device comprising a movable member having three mechanically connected loops, and a single magnetizable frame-member for providing two alternating magnetic fluxes and applying said fluxes to the loops in such manner that a half of one flux interlinks the first and third of said loops and the whole of said flux has a torque-producing reaction with the current traversing a loop-side of the second loop, and in such manner that the whole of the other flux interlinks said second loop and also has torque-producing reactions with a loop-side of each of the first and third loops said magnetizable frame-member including magnetizable-material flux-paths, airgap flux-paths, and single-phase exciting-means, for together providing and applying said fluxes, the magnetizable frame-member having three airgaps in which the three aforementioned loop-sides are disposed, the first and third airgaps being wedge-shaped, with the thick end of the wedge toward the second airgap.

ARTHUR C. MEHRING.
SHIRLEY L. GOLDSBOROUGH.